T863005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1000

781,692

HIGH REMOVAL ADDITIVE TYPE TOBACCO SMOKE FILTER

John R. Hatfield, William E. Morrell, and Kyle E. Morrison, all of P.O. Box 511, Kingsport, Tenn. 37662

Continuation of application Ser. No. 674,754, Oct. 12, 1967, now abandoned. This application Nov. 29, 1968. Published June 24, 1969

Int. Cl. A24f *7/04, 13/04;* B01d *27/00*

U.S. Cl. 131—266

No Drawing. 16 Pages Specification

A tobacco smoke filter element containing aluminum silicate particles for removing a high amount (up to about 80 percent) of the total particulate matter found in the effluent stream of tobacco smoke. The effective particle size of the aluminum silicate additive is less than 5 microns and the effective pH of the particles is less than 7.5.